United States Patent [19]

Damon et al.

[11] Patent Number: 5,050,100
[45] Date of Patent: Sep. 17, 1991

[54] BIT MAP MEMORY MANAGEMENT FOR A PAGE PRINTER

[75] Inventors: Brian W. Damon; Cuong M. Hoang; Jeffrey A. Minnick; Terry W. Ringle; Warren J. Spina; Stephen R. Troyer, all of Lexington, Ky.

[73] Assignee: Lexmark International, Inc., Greenwich, Conn.

[21] Appl. No.: 569,323

[22] Filed: Aug. 17, 1990

[51] Int. Cl.$^5$ .................................... G06K 15/00
[52] U.S. Cl. .................................... 364/514; 364/900; 364/930
[58] Field of Search ............... 364/518–521, 364/235 MS, 930 MS, 955 MS, 955.1 MS; 346/154; 340/723

[56] References Cited

U.S. PATENT DOCUMENTS 4,692,757  9/1987  Tsuhara ........................... 340/723
4,843,405  1/1988  Marikawa ........................ 364/521

Primary Examiner—Arthur G. Evans
Attorney, Agent, or Firm—John J. McArdle, Jr.

[57] ABSTRACT

A printer having a print engine (13) and a bit map memory (12) including a number of page image areas (31) into which information to be printed is rasterized and from which information for the print engine is serialized. A digital processor (11) controlling the print engine is operable to reduce a page image area (31) to a modified page image area (37) based upon the highest and lowest addresses at which information has been written into the page image area. The digital processor (11) is also operable to begin rasterization of a new page image area when a sufficient amount of an existing page image area (41) has been serialized to make available the requisite bit map memory for the new page.

4 Claims, 5 Drawing Sheets

BIT MAP MEMORY MANAGEMENT FOR A PAGE PRINTER

FIELD OF THE INVENTION

This invention relates generally to page printers having full page image areas in bit map form and more particularly concerns such printers in which more than one page image area can be allocated at the same time.

BACKGROUND OF THE INVENTION

Page printers may take various forms, in part dependent upon the type of print engine. For example, page printers may include electrophotographic printers and ink jet printers. A page printer typically has a bit map memory large enough to contain at least one full page image area so that a page to be printed can be fully composed before driving the print engine to actually print on paper or other recording medium.

A page is allocated space in the bit map memory sufficient to image a full physical page, this amount of memory being termed a page image area. The page information is then placed into the page image area during rasterization. After rasterization is complete, the image information is transferred from the page image area to the print engine during serialization.

Normally, if the bit map memory is large enough, more than one page can be fully rasterized and stored in memory for subsequent serialization. Serialization can occur at the same time as rasterization. In the usual case, after one page image area is fully rasterized, a second and subsequent page image areas are allocated and rasterized. Serialization of rasterized pages can occur independently of rasterization.

When no further bit map memory is available to hold an entire page image area to rasterize another page, further rasterization is postponed until an already-rasterized page image area is serialized to the print engine for printing. After serialization of a page image area, that area is then returned to the available bit map memory pool to be used to rasterize another page.

OBJECT OF THE INVENTION

It is the general aim of the invention to provide improved bit map memory management in page printers of the foregoing type.

SUMMARY OF THE INVENTION

This objective has been accomplished in accordance with one aspect of the invention by minimizing the size of page images to that which is necessary to serialize the page information to the print engine. To do this, when rasterization is complete, the lowest modified location in the bit map memory is adjusted down and the highest location in the bit map memory is adjusted up to the next raster scan boundaries. The number of blank scans from the top of the page image to the lowest modified location (top margin), and from the highest modified location to the bottom of the page image area (bottom margin) are returned to the pool of available bit map memory for subsequent rasterizations.

The foregoing objective has been accomplished in accordance with another principle of the invention by reclaiming a partial page image area after partial serialization when the reclaimed bit map memory will provide sufficient memory for rasterization of another page image area.

Other objects and advantages of the invention shall become apparent upon reading the following detailed description and upon reference to the drawings in which.

DETAILED DESCRIPTION

Figure 1:
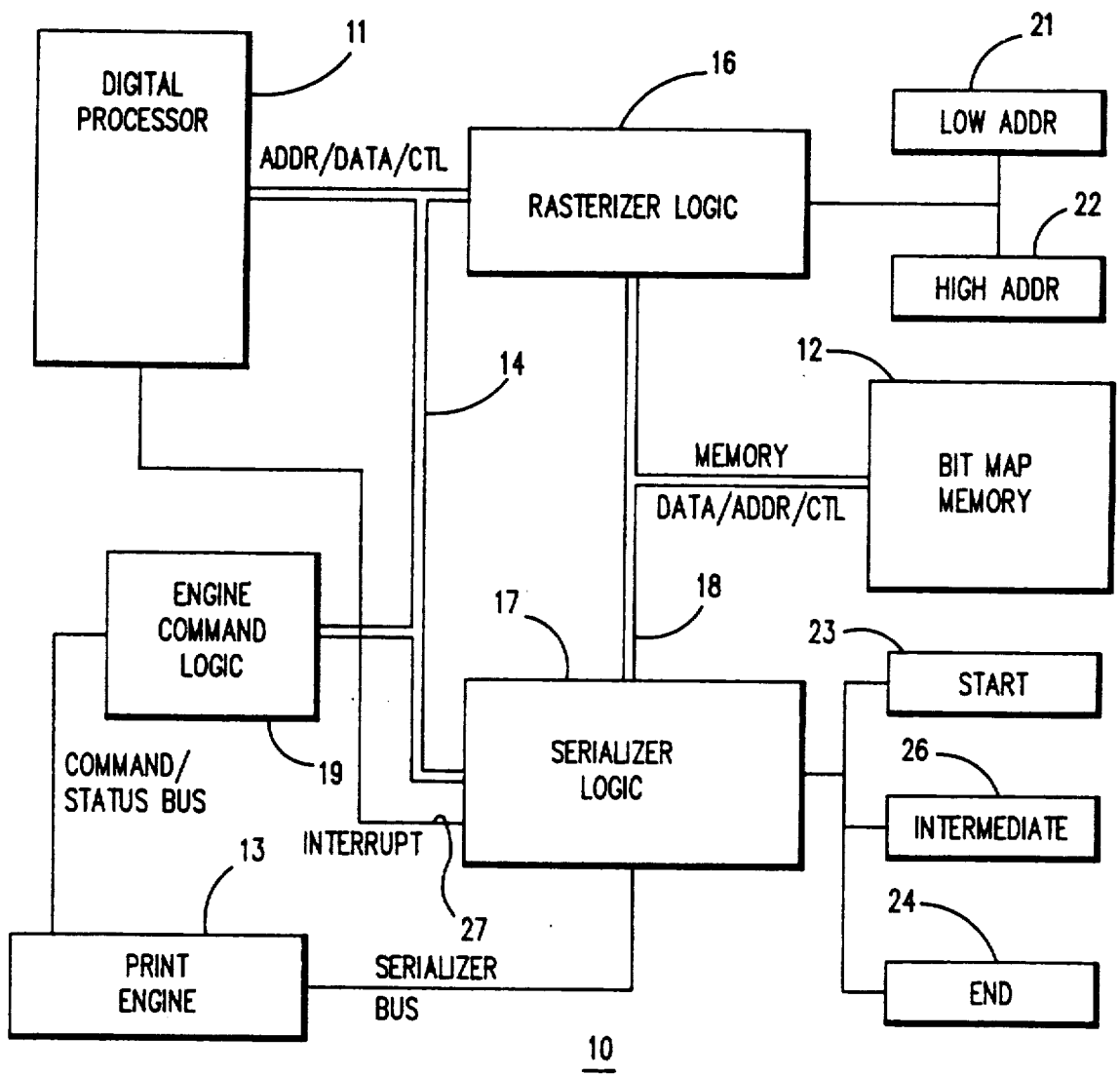
FIG. 1 is a block diagram of a page printer in accordance with the present invention.

While the invention is susceptible to various modifications and alternative forms, a. specific embodiment thereof has been shown by way of example in the drawings and will herein be described in detail. It should be understood that it is not intended to limit the invention to the particular form disclosed, but the intention is to cover all modifications, equivalents, and alternatives falling within the spirit and scope of the invention.

Referring first to FIG. 1, a page printer 10 includes a digital processor 11, which coordinates rasterization and serialization of a bit map memory 12, and control of a print engine 13. The processor 11 includes associated memory for data storage and executable code. The processor 11 communicates on a bus 14 (containing address, data and control lines) with rasterizer logic circuitry 16 and serializer logic circuitry 17.

The processor 11 sends appropriate data, control and address signals to the rasterizer logic circuitry 16 to rasterize information into the bit map memory 12 for pages to be printed by the print engine 13. The processor 11 also controls the serializer logic circuitry 17 to serialize page data from the bit map memory 12 to the print engine 13 for printing. The rasterizer logic circuitry 16 and the serializer logic circuitry 17 communicate with the bit map memory 12 on a bus 18, which is similar to the bus 14. The print engine 13 is controlled by print engine command logic circuitry 19, which may include a programmed microprocessor. The print engine command logic circuit 19 controls paper feed, printhead positioning, etc. for the print engine 13. The serializer logic circuitry 17 provides the actual data used by the printhead for printing.

During rasterization of a particular page image area, the rasterizer logic circuitry 16 tracks the lowest and highest bit map memory addresses written to and maintains this information in low and high address registers 21 and 22. The serializer logic circuitry 17 receives the starting address for a page image area being serialized from the processor 11, and this address is written to a register 23. The end address for a page image area being serialized is written to a register 24. As shall be described subsequently, if the digital processor 11 has requested the serializer logic circuit 17 to provide an indication that a certain point in the serialization of the page image area has been reached, the value for the address for this point is maintained in an intermediate address register 26. As will be described, this intermediate address indicates the point at which a sufficient portion of a page has been serialized to allow the rasterization of a new page image area including the already-serialized area. The serializer logic circuitry 17 provides an interrupt to the processor 11 on a line 27 when this occurs and also when serialization of a page is complete.

Figure 3:
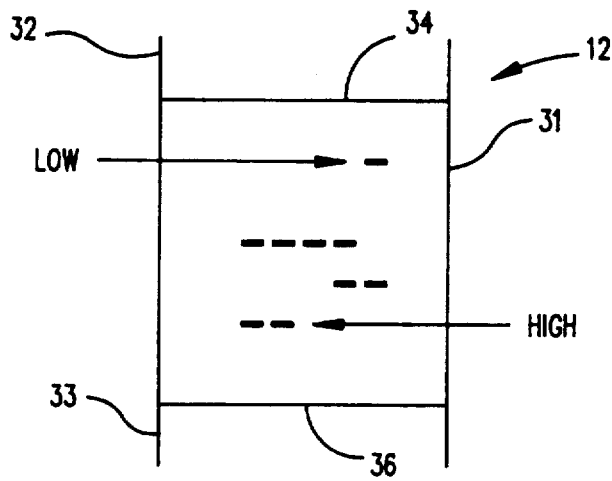
FIG. 3 is a simplified schematic illustration of a page image area in the bit map memory of the printer of FIG. 1.

Turning now to FIG. 3, the bit map memory 12 is illustrated diagrammatically and includes a page image area 31 into which page information is being rasterized. Above and below the page image area 31 are areas 32 and 33. Area, 32 may be, for example, a previously rasterized page image area; and area 33 may be bit map memory space available for rasterization. The lowest and highest addresses in the page image area 31 to which information has actually been rasterized are indicated in FIG. 3 as "LOW" and "HIGH". In practice, the bit map memory 12 is "circular" with address wrapping from the top of the memory to the bottom.

Figure 2:
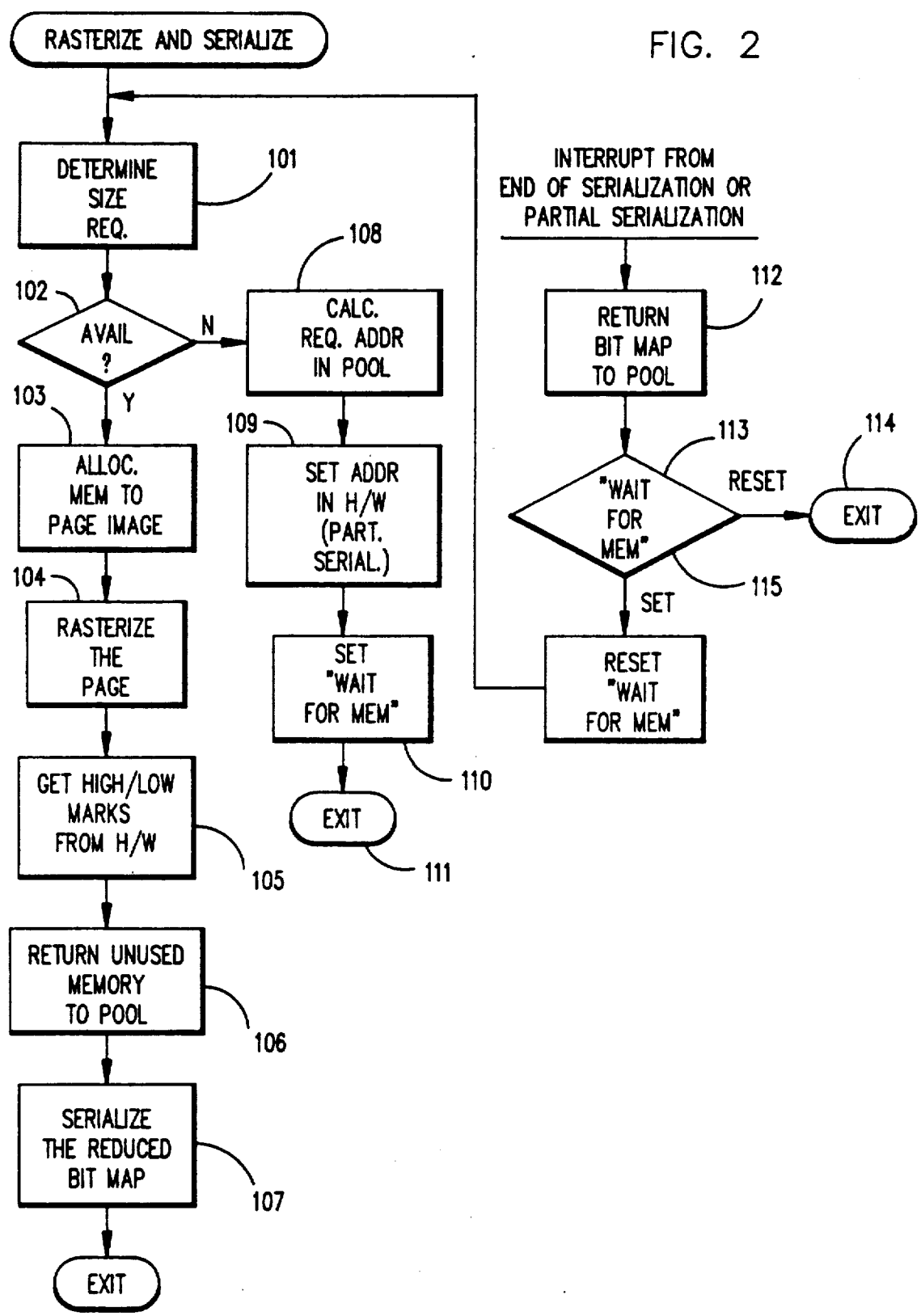
FIG. 2 is a flow chart of the operation of the processor in the printer of FIG. 1 to implement the present invention.

The processor 11, in controlling rasterization and serialization, executes instructions in accordance with the flow chart shown in FIG. 2. The processor, for rasterization, first determines the size of page image area required (101), based upon the size of the page to be printed. If this amount of bit map memory is available (102), the processor allocates the memory to the page image (103).

To do this, the processor takes the starting address of the unrasterized page area and determines the ending address for the necessary size of page image area. In FIG. 3, this would begin at the first address below the line 34 and end at the last address above the line 36 if the page image area 31 were being allocated.

The page image area is then rasterized (104) by the provision of appropriate data and address and control information to the rasterizer logic circuitry 16 to place the information in the page image area in the bit map memory 12. As will be described in more detail hereinafter, the rasterizer logic circuitry 16 maintains the low and high addresses used in the page image area during rasterization. After rasterization, these values are obtained (105) by the processor 11 from the rasterizer logic circuitry 16. The processor then returns the unused bit map memory from the page image area (such as 31) to the bit map memory pool (106).

Figure 4:
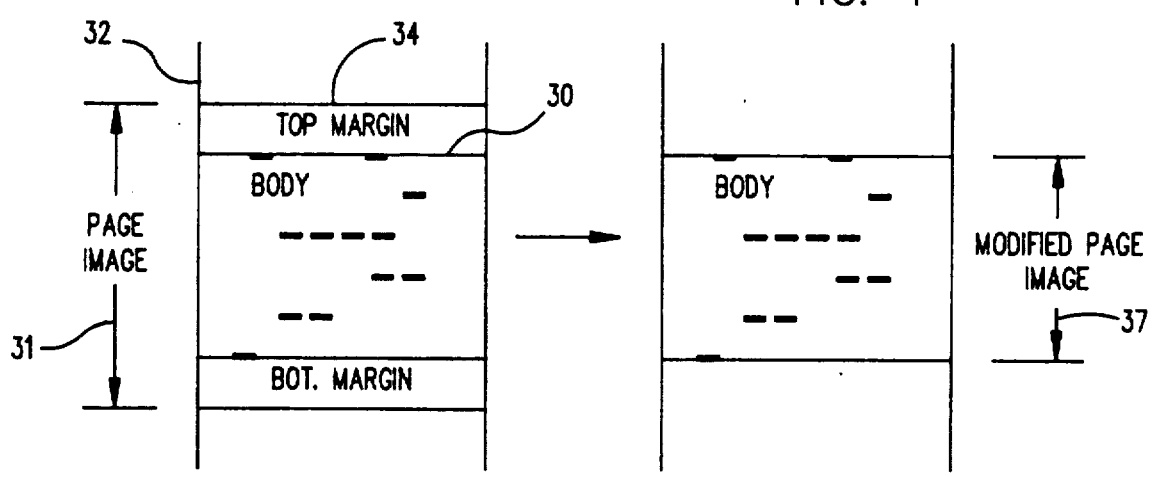
FIG. 4 is an illustration similar to that of FIG. 3 showing a modified page image area.

With additional reference to FIG. 4, in returning unused bit map memory to the memory pool, the low address is adjusted to the address pointing to the beginning of the first scan line to be serialized, after the blank lines of the top margin. The high address is adjusted to the address pointing to the end of the last scan line to be serialized, before the trailing blank lines of the bottom margin. The image area 31 is thereby reduced to a modified image area 37.

The low and high addresses obtained after the above-described adjustments are written to the start register 23 and the end register 24 used by the serializer logic circuitry 17 for serializing the modified page image area. The processor then initiates serialization (107) of the modified page image area by the serializer logic circuitry 17. Serialization of the modified page image area may, of course, be postponed if there are other rasterized image areas to be serialized prior to the modified image area 37.

If, in determining (102) whether or not there is available bit map memory for a page image area which is to be rasterized, the processor determines that there is insufficient available bit map memory, the processor then calculates (108) the required address in the bit map memory pool to serve as the ending address of the required page image area. This address will lie within an already-rasterized, and not yet serialized, page image area.

Figure 5:
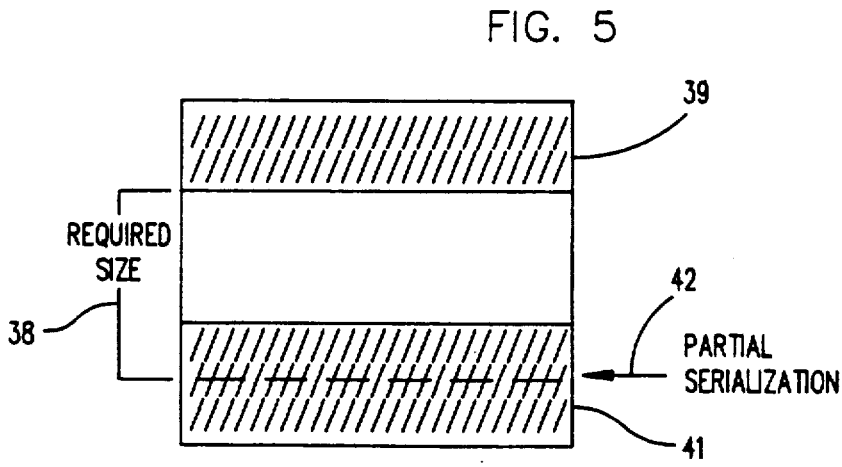
FIG. 5 is an illustration similar to FIGS. 3 and 4 showing partial serialization and reclamation of a partial page image area.

As shown in FIG. 5, the required page image area 38 begins at the end of rasterized, unserialized, page image area 39. The required ending point for the page image area 38 falls within another unserialized page image area 41. The partial serialization point 42 in the page image area 41 indicates how much of the area 41 must be serialized before there is sufficient free memory for the beginning of rasterization of the page image area 38.

After the processor calculates (108) the required address for the end of the page image area 38, the processor then sets (109) this address in the intermediate, or partial serialization, register 26 (FIG. 1). The processor also sets (110) a "wait for memory" flag in its working memory. The processor then exits (111) from the rasterization sequence to perform other tasks.

The processor 11 receives an interrupt on the line 27 (FIG. 1) from the serializer logic circuitry when a page image area has been serialized to the print engine to the point of either an intermediate address value stored in the register 26 or the end address value stored in the register 24. As shown in FIG. 2, the interrupt from the end of serialization or partial serialization is recognized by the processor, which in turn returns (112) the serialized bit map portion to the bit map memory pool. In the case of full serialization of a page image area, the entire page image area is returned to the bit map memory pool. With regard to FIG. 4, for example, if the page image 32 is serialized and is freed, and the area 31 has already been rasterized, the end of free memory address is changed to the address of the memory location at the beginning of the scan line at line 30. This reclaims the memory that was in the top margin of the page image area 31.

If the interrupt is indicative of partial serialization, such as serialization to the address at 42 of FIG. 5, the portion of the page image area 41 down to the last address on the line 42 is returned to the memory pool.

The processor then checks (113) to determine if the "wait for memory" flag is set. If it is not, the processor exits (114) from the routine, having returned a fully serialized page image area to the memory pool. If the flag is set, then the processor resets (115) the flag and returns to the beginning of the rasterization and serialization routine already described. The processor then determines the size required for the next page image area. For example, in the case of the page image area 38 of FIG. 5, this area will now fit into the available space in the bit map memory due to the return to the memory pool of the portion of the page image area 41 above the line 42.

Figure 6:
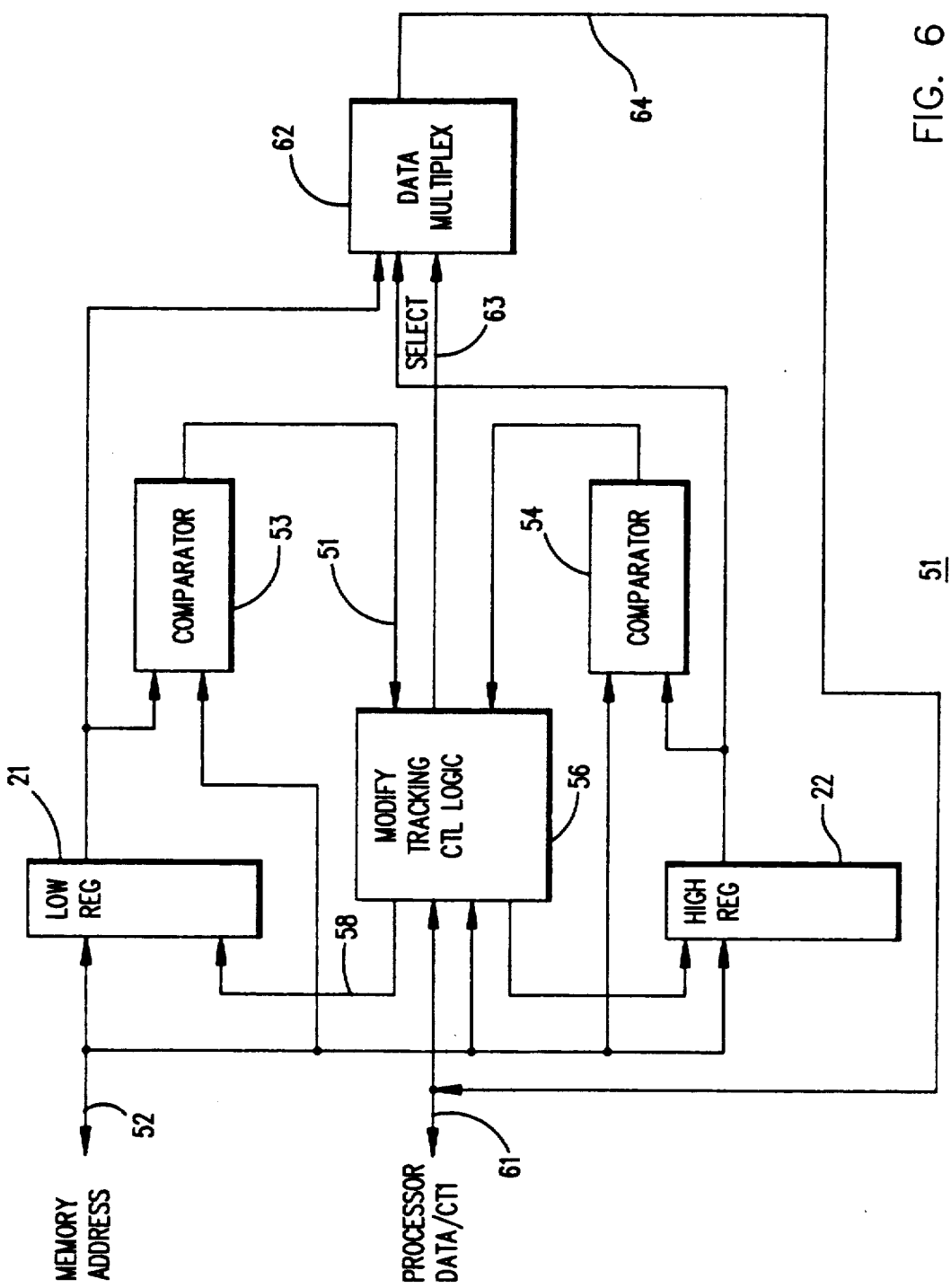
FIG. 6 is a more detailed block diagram of the circuitry for bit map modification tracking.

With reference now to FIG. 6, the rasterizer logic circuitry 16 (FIG. 1) includes circuitry for maintaining the low and high addresses at which page image modifications were made during rasterization. The circuitry of FIG. 6 is contained within the rasterizer logic circuitry 16, except for the low address register 21 and the high address register 22. As the rasterizer logic circuitry places data information supplied by the processor 11 into the bit map memory 12 at the addresses on the address lines of the memory bus 18, this address information is supplied to the circuitry 51 of FIG. 6 for maintaining the highest and lowest addresses used in the registers 21 and 22. The memory address information on the bus 52, which is part of the bus 18 of FIG. 1, is coupled to the two address registers 21, 22 and a pair of comparators 53, 54. The address information is also supplied to a control logic circuit 56, the function of which shall be described subsequently. The address information on the bus 52 comprises the series of addresses to which data is written in the bit map memory during rasterization of a page image area.

As each memory address appears on the bus 52, the comparator 53 compares this address with the lowest previous address to which data has been written in the present page image area, which is stored in the register 21. Simultaneously, the comparator 54 compares the previous high address to the current address on the bus 52. If the current address is lower than the previously lowest address, the comparator 53 provides a signal on a line 51 to the control logic circuitry 56. The control logic circuitry then activates a control line 58 to write the new address value into the register 21. The comparator 54 and control logic circuit 56 effect a similar writing of the current address to the register 22 if it is higher than the previously highest address.

At the conclusion of rasterization, the processor signals the control logic circuitry 56 via control lines in the data/control bus 61, which is part of the bus 14 of FIG. 1, to obtain the values in the low and high registers 21, 22. When the control logic circuitry 56 is interrogated for this information by the processor, it provides a first, then a second, signal to a multiplexer 62 on a select line 63 to place the low register address value followed by the high register address value on data lines 64 to be read by the processor. The processor then uses these addresses to minimize the page image area as described previously with reference to FIGS. 2 and 4.

Figure 7:
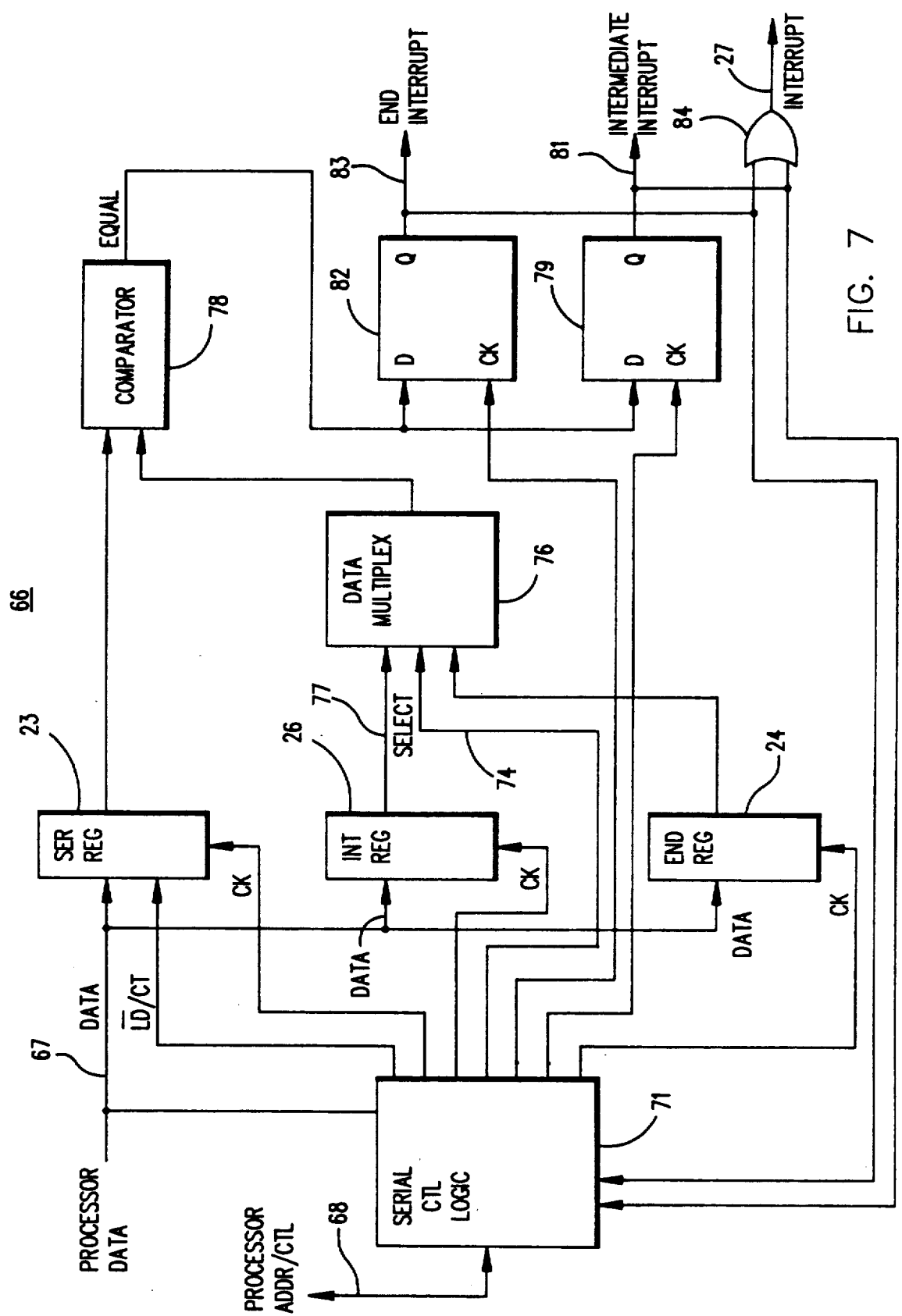
FIG. 7 is a more detailed block diagram of the circuitry for the generation of an intermediate interrupt during serialization.

With reference to FIG. 7, the portion 66 of the serializer logic circuitry 17 used to produce intermediate and end of serialization interrupts is coupled to the processor data lines 67 and address and control lines 68, all of which combine to form the bus 14 (FIG. 1). The processor provides information to the serializer logic circuitry on the bus 14, and receives an interrupt signal from the logic circuitry 17 on an interrupt line 27.

Before serialization, the processor loads the serializer count register 23. To do this, the LD (not)/CT line is taken to a logic low; and the clock (CK) signal is driven high and then low. The LD (not)/CT line is then taken to a logic high. The count data loaded represents the memory address where the first data to be serialized to the print engine is stored. The clock signals are provided to the register 23 by serial control logic circuitry 71, which may be regarded as the balance of the serializer logic circuitry 17 of FIG. 1. The clock pulses result from the sequence of address and control signals from the processor on the lines 68.

Before the beginning of serialization of a page, the intermediate interrupt register 26 is written to by the processor to place in the register the value of the memory address for partial serialization, if any. This address is the address to which the serializer count register 23 should be equal for generation of an intermediate interrupt. The processor then writes the end interrupt register 24 with the value for the generation of an end interrupt, at the end of the page image area to be serialized.

During serialization, data from the bit map memory is serialized to the print engine, and after each increment of data, such as 32 bits of data for example, sent to the print engine, the serializer control logic 71 toggles the clock input to the serializer register 23 to increment the register to the next location to be serialized from the bit map.

After each such increment, the serial control logic circuitry 71 sets a select signal on a line 74 low. This causes a multiplexer 76 to select the output of the intermediate register 26 on the line 77 to couple the intermediate register value to a comparator 78. The comparator 78 compares the intermediate register value with the new serializer count register value to see if an intermediate interrupt should be generated. If the two register values are equal, there will be a logic high at the data input to a flip-flop 79, which is clocked to the Q output 81 of the flip-flop 79.

The serial control logic circuit 71 then sets the select signal on the line 74 high, to effect a comparison between the output of the end address register 24 and the output of the serializer count register 23 by the comparator 78.

If the value in the serializer count register 23 has reached that of the end register 24, a logic high is produced on the data input to a flip-flop 82, which is clocked to its output 83 by the serializer control logic circuit 71.

The interrupt lines 81 and 83 are ORed together by an OR gate 84, to produce an interrupt signal on the line 27 if the serialization has reached either the intermediate address point or the end address point.

By suitably addressing the serial control logic 71, the processor can read the state of the interrupt lines 81 and 83 on the processor data bus 66 to determine which interrupt has occurred.

What is claimed is:

1. A printer having a print engine, a bit map memory including at least one page image area defined by a beginning address and an end address, means for rasterizing information to be printed into the page image area, and means for serializing information to be printed from the page image area to the print engine, the improvement comprising:

means for storing the highest and lowest addresses in the page image area at which information is written during rasterization; and means for defining, after rasterization of the page image area, a modified smaller page image area having a beginning address based upon said lowest address and an ending address based upon said highest address, whereby portions of bit map memory in the page image area that are not in the modified page image area are available for rasterization of other page image areas.

2. The printer of claim 1 in which the bit map memory includes a second page image area defined by a beginning address and an end address, the beginning address of the second page image area being based upon the end address of the modified page image area.

3. In a printer having a print engine and a bit map memory, which includes a first page image area having a beginning address and an ending address, the improvement comprising:

means for determining the ending address for a second page image area, which is an intermediate address within the first page image area;

means for storing said intermediate address;

means for determining, during serialization of the first page image area, when the first page image area has been serialized to said intermediate address; and means for indicating the availability of the second page image area for rasterization in response to the determination that serialization of the first page image area has reached said intermediate address.

4. The printer of claim 3 which further includes means for indicating the completion of serialization of the first page image area.

* * * * *